United States Patent [19]

Model

[11] 4,231,931
[45] Nov. 4, 1980

[54] TETRAPHENYLKETAZINES AND ISOINDOLINONE PIGMENTS OBTAINED THEREFROM

[75] Inventor: Ernst Model, Basel, Switzerland

[73] Assignee: Ciba-Geigy Corporation, Ardsley, N.Y.

[21] Appl. No.: 7,549

[22] Filed: Jan. 30, 1979

[30] Foreign Application Priority Data

Feb. 3, 1978 [CH] Switzerland ............... 1215/78

[51] Int. Cl.³ .......................... C07D 209/34
[52] U.S. Cl. ............... 260/325 PH; 106/288 Q; 564/249
[58] Field of Search ................... 260/325 PH

[56] References Cited

U.S. PATENT DOCUMENTS

| | | | |
|---|---|---|---|
| 3,810,889 | 5/1974 | Model | 260/240 G |
| 4,006,162 | 2/1977 | Model | 260/325 PH |

Primary Examiner—Donald G. Daus
Assistant Examiner—Lisa Jones
Attorney, Agent, or Firm—Joseph F. DiPrima; Harry Falber

[57] ABSTRACT

Isoindolinone pigments of the formula

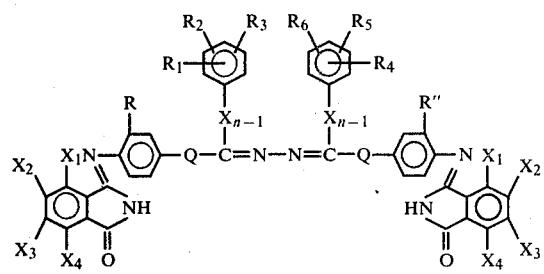

wherein $X_1$, $X_2$, $X_3$ and $X_4$ represent hydrogen or halogen atoms, or one or two of $X_1$-$X_4$ represent alkoxy groups of 1 to 4 carbon atoms or phenoxy groups and the others represent hydrogen or halogen atoms, R and R" represent hydrogen or halogen atoms or methyl or methoxy groups, $R_1$, $R_2$, $R_4$ and $R_5$ represent hydrogen, chlorine or bromine atoms or alkyl groups of 1 to 2 carbon atoms, $R_3$ and $R_6$ represent hydrogen or halogen atoms, alkyl or alkoxy groups of 1 to 2 carbon atoms or radicals of the formula

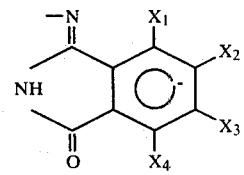

Q represents a direct bond or a p-phenylene group, n is 1 or 2 and X represents a group of the formula

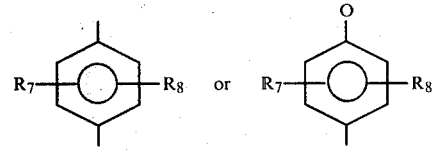

wherein $R_7$ and $R_8$ represent hydrogen or chlorine atoms or methyl groups.

6 Claims, No Drawings

TETRAPHENYLKETAZINES AND ISOINDOLINONE PIGMENTS OBTAINED THEREFROM

The invention provides novel isoindolinone pigments of the formula

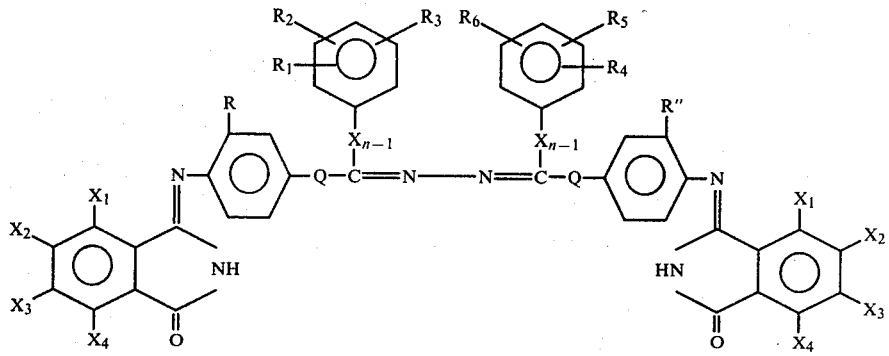

(I)

wherein $X_1$, $X_2$, $X_3$ and $X_4$ represent hydrogen or halogen atoms, or one or two of $X_1$–$X_4$ represent alkoxy groups of 1 to 4 carbon atoms or phenoxy groups and the others represent hydrogen or halogen atoms, R and R″ represent hydrogen or halogen atoms or methyl or methoxy groups, $R_1$, $R_2$, $R_4$ and $R_5$ represent hydrogen, chlorine or bromine atoms or alkyl groups of 1 to 2 carbon atoms, $R_3$ and $R_6$ represent hydrogen or halogen atoms, alkyl or alkoxy groups of 1 to 2 carbon atoms or radicals of the formula

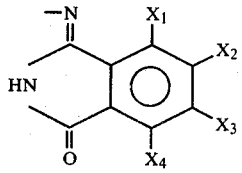

Q represents a direct bond or a p-phenylene group, n is 1 or 2 and X represents a group of the formula

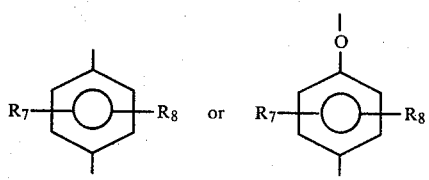

wherein $R_7$ and $R_8$ represent hydrogen or chlorine atoms or methyl groups.

Preferred pigments are those of the formula (I) containing iminoisoindolinone radicals of the formula

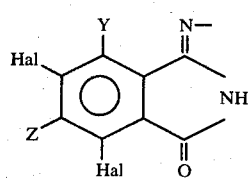

wherein Hal represents a chlorine or bromine atom, Y and/or Z represent chlorine or bromine atoms or alkoxy groups of 1 to 4 carbon atoms, and, in particular, those pigments of the formula (I) wherein $X_1$, $X_2$, $X_3$ and $X_4$ represent chlorine atoms.

Particularly preferred pigments are those of the formula (I) wherein $R_3$ and $R_6$ represent hydrogen, chlorine or bromine atoms, methyl or methoxy groups in the para-position to X, and especially those of the formula (I), wherein Q is a direct bond and n is 1.

The pigments of the present invention are obtained by condensing 2 or 4 moles of an isoindolinone of the formula

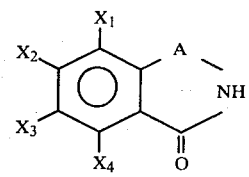

(II)

wherein $X_1$, $X_2$, $X_3$ and $X_4$ are as previously defined and A represents a group of the formula

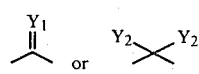

wherein $Y_1$ represents an imino or thio group and $Y_2$ represents a halogen atom, an alkoxy group of 1 to 4 carbon atoms or a secondary amino group, with 1 mole of an amine of the formula

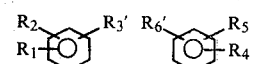

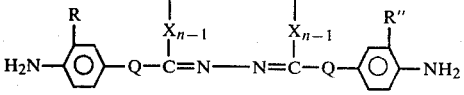

(III)

wherein R, R″, $R_1$, $R_2$, $R_4$ and $R_5$ are as previously defined and $R_3'$ and $R_6'$ represent hydrogen or halogen atoms, alkyl or alkoxy groups of 1 to 2 carbon atoms or amino groups in the para-position to X, and Q is a direct bond or represents a p-phenylene group.

The preferred starting materials are isoindolinones of the formula

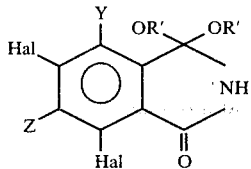 (IV)

wherein the symbols R' represent alkyl groups of 1 to 4 carbon atoms, Y and Z are as previously defined, and especially those isoindolinones wherein $X_1$–$X_4$ in formula (II) represent chlorine atoms.

Examples of such isoinsolinones are:
3-amino-isoindolinone
3-imino-4-chloro-isoindolinone
3-imino-5-chloro-isoindolinone
3-imino-6-chloro-isoindolinone
3-imino-7-chloro-isoindolinone
3-imino-5,6-dichloro-isoindolinone
3-imino-4,5-dichloro-isoindolinone
3,3-dimethoxy-4,5-dichloro-isoindolinone
3,3-dimethoxy-4,7-dichloro-isoindolinone
3,3-dimethoxy-4,5,6,7-tetrachloro-isoindolinone
3,3,6-trimethoxy-4,5,7-trichloro-isoindolinone
3,3-dimethoxy-4,5,7-trichloro-6-ethoxy-isoindolinone
3,3-dimethoxy-4,5,7-trichloro-6-n-propoxy-isoindolinone
3,3-dimethoxy-4,5,7-trichloro-6-n-butoxy-isoindolinone
3,3-dimethoxy-4,5,7-trichloro-6-phenoxy-isoindolinone
3,3,4,6-tetramethoxy-5,7-dichloro-isoindolinone.

The compounds are known ones or compounds which can be obtained by known methods.

The invention also provides the novel amines of the formula

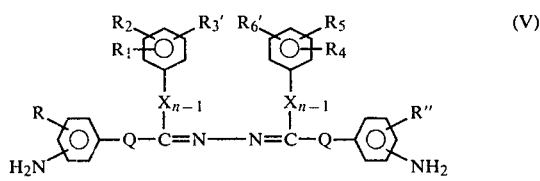 (V)

wherein R, R'', $R_1$, $R_2$, $R_4$, $R_5$, $R_3'$, $R_6'$, Q, X and n are as previously defined. They are obtained by condensation of 1 mole of hydrazine with 1 mole of an amine of the formula

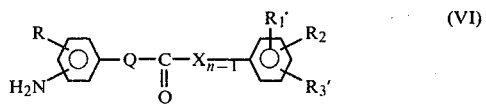 (VI)

and with 1 mole of an amine of the formula

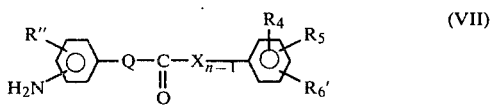 (VII)

Amines used for the manufacture of the pigments of the formula (I) are preferably those of the formula (III), wherein $R_3'$ and $R_6'$ represent hydrogen, chlorine or bromine atoms, methyl or methoxy groups in the para-position to X, and especially those wherein Q is a direct bond and n is 1.

The nomemclature used in the following Examples is derived from the tetraphenylketazine of the formula

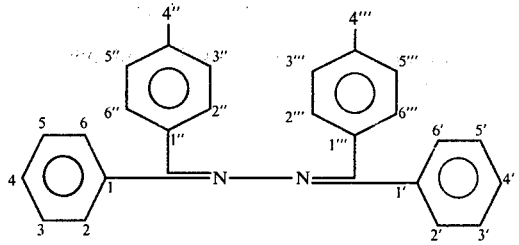

with the indicated numbering.
4,4'-diamino-tetraphenylketazine
4,4'-diamino-4'',4'''-dichloro-tetraphenylketazine
4,4'-diamino-4'',4'''-dimethyl-tetraphenylketazine
4,4'-diamino-4'',4'''-dimethoxy-tetraphenylketazine
4,4'-diamino-3,3',5'',4'''-tetramethyl-tetraphenylketazine
4,4'-diamino-3,3'-dimethyl-4'',4'''-dimethoxy-tetraphenylketazine
4,4'-diamino-4'',4'''-diphenoxy-tetraphenylketazine
4,4'-diamino-4'',4'''-diphenyl-tetraphenylketazine
4,4'-diamino-3,3'-dimethyl-4'',4'''-diphenyl-tetraphenylketazine
4,4'-diamino-3'',3''',4'',4'''-tetramethyl-tetraphenylketazine
4,4'-diamino-2'',2''',4'',4'''-tetrachloro-tetraphenylketazine
4,4'-diamino-3,3',3'',3''',4'',4'''-hexamethyl-tetraphenylketazine
4,4'-diamino-3,3'-dimethyl-2'',2''',4'',4'''-tetrachloro-tetraphenylketazine
4,4'-diamino-3'',3''',4'',4'''-tetramethoxy-tetraphenylketazine
4,4',4'',4'''-tetramino-tetraphenylketazine
3'',3''',4,4'-tetramino-tetraphenylketazine
3'',3''',4,4 α-tetramino-4'',4'''-dichloro-tetraphenylketazine
4,4'-diamino-4'',4'''-di-(o-aminophenoxy)-tetraphenylketazine
4,4'-diamino-4'',4'''-di-(p-aminophenoxy)-tetraphenylketazine
4,4'-diamino-4'',4'''-di-(p-amino-o-chlorophenoxy)-tetraphenylketazine.

The above amines can be obtained by condensation of the corresponding aminobenzophenones with hydrazine.

Where 3-imino-, 3-thio- or 3,3-bis-sec-amino-4,5,6,7-tetrachloroisoindolin-1-ones or alkali salts of 3,3-dialkoxy-4,5,6,7-tetrachloroisoindolin-1-ones are used as starting materials, then it is advantageous to use water-miscible organic solvents, e.g. lower aliphatic alcohols, such as lower alkanols, for example methanol, isopropanol or butanol, lower cyclic ethers, such as dioxan, ethylene glycol monomethyl ether, lower aliphatic ketones, such as acetone. In doing so, the condensation is able to take place even at relatively low temperatures. It is advantageous to perform the reaction in the presence of an agent binding alkali and organic bases, for example a lower fatty acid which can be used simultaneously as solvent, especially acetic acid.

If the starting material is a 3,3-dihalogeno-4,5,6,7-tetrachloroisoindolin-1-one, it is preferred to use an organic solvent that does not contain hydroxyl groups; for example an aromatic hydrocarbon, such as benzene, toluene, xylene, tetrahydronaphthalene or diphenyl; a cycloaliphatic hydrocarbon, for example cyclohexane; a halogenated aliphatic hydrocarbon, for example carbon tetrachloride or tetrachloroethylene, or a halogenated aromatic hydrocarbon, for example chlorobenzene or di- and trichlorobenzene; also a nitrated hydrocarbon, for example nitrobenzene; an aliphatic ether, for example dibutyl ether; an aromatic ether, for example diphenyl ether, or a cyclic ether, for example dioxan; also a ketone, for example acetone; or an ester, for example an ester of a lower fatty acid with a lower alkanol, for example ethyl acetate, in the presence of an acid acceptor.

Directly after their formation the pigments of the present invention precipitate from the reaction medium. For certain purposes they can be used direct as crude pigments; but their properties, especially with respect to purity, form, and hiding power, can also be improved by known methods, for example by extraction with organic solvents or by grinding with grinding assistants which can afterwards be removed, for example salts, or by precipitation with an alkali.

The new colourants constitute valuable pigments which, in finely divided form, can be used for pigmenting organic material of high molecular weight, for example cellulose ethers and esters, such as ethyl cellulose, acetyl cellulose, nitrocellulose, polyamides and polyurethanes or polyesters, natural resins or synthetic resins, such as polymerisation or condensation resins, for example aminoplasts, in particular urea/formaldehyde and melamine/formaldehyde resins, alkyd resins, phenolic plastics, polycarbonates, polyolefins, such as polystyrene, polyvinyl chloride, polyethylene, polypropylene, polyacrylonitrile, polyacrylates, thermoplastic or curable acrylic resins, rubber, casein, silicon and silicone resins, singly or in mixtures.

It is immaterial whether the cited materials of high molecular weight are in the form of plastics, melts or of spinning solutions, lacquers, paints or printing inks. Depending on the use to which they are put, it is advantageous to use the new pigments as toners or in the form of preparations.

The colourations obtained are characterised by high colour strength, great purity of shade, and good fastness to alkali, overstripe bleeding, light, migration and atmospheric influences.

The invention is illustrated by the following Examples in which the percentages are by weight.

EXAMPLE 1

17.25 g of 3,4,5,6-tetrachlorocyanobenzoic acid methyl ester are stirred with 57.5 ml of a 1 N sodium methylate solution in methanol until a clear solution is obtained. The sodium salt of 3,3-dimethoxy-4,5,6,7-tetrachloroisoindolin-1-one forms. With good stirriang, 11.5 g of 4,4'-diamino-4",4'''-dichloro-tetraphenylketazine (ground and sieved) and 100 ml of o-dichlorobenzene are added. At a bath temperature of 110° C., the internal temperature is raised in the course of 2 hours to 90° C. while distilling off methanol, whereupon the sodium salt of the pigment precipitates without a clear solution having formed. The batch is diluted with a further 100 ml of o-dichlorobenzene and, when the internal temperature has reached 100° C. (bath temperature 130° C.), acidified with 20 ml of glacial acetic acid. The temperature is raised to 140°–150° C. and kept thereat for 2 hours with good stirring. The insoluble pigment is filtered off at 120° C., washed with methanol, acetone and water, and dried, to yield 24 g of a productive orange pigment, which in the form in which it is obtained, or after it has been ground by one of the conventional methods, can be used for colouring plastics and for obtaining printing pastes and lacquers. The orange colourations obtained therewith are characterised by outstanding fastness properties.

Analysis: Calculated: C 50.8; H 1.8; N 8.4. Found: C 51.0; H 2.1; N 8.8.

EXAMPLE 2

An orange pigment with similar properties is obtained by using 3,4,5,6-tetrabromo-o-cyanobenzoic acid methyl ester instead of 3,4,5,6-tetrachloro-o-cyanobenzoic acid methyl ester.

EXAMPLE 3

By using equimolar amounts of 3,4,6-trichloro-5-methoxy-o-cyanobenzoid acid methyl ester instead of 3,4,5,6-tetrachlorocyanobenzoic acid methyl ester, an orange pigment is obtained which, when incorporated into plastics, printing pastes and lacquers, has similarly good properties.

EXAMPLES 4 TO 40

Table I lists further pigments which are obtained by condensing an isoindolinone of the formula

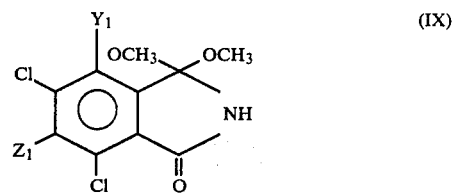

wherein $Y_1$ and $Z_1$ have the indicated meanings, with a diamine of the formula

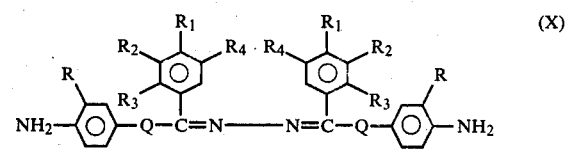

wherein $R$, $R_1$, $R_2$, $R_3$, $R_4$ and $Q$ have the indicated meanings.

TABLE I

| | | | | Q = direct bond | | | | |
| No | $Y_1$ | $Z_1$ | R | $R_1$ | $R_2$ | $R_3$ | $R_4$ | Shade |
| --- | --- | --- | --- | --- | --- | --- | --- | --- |
| 5 | Cl | Cl | H | H | H | H | H | scarlet |
| 6 | Cl | Cl | $CH_3$ | H | H | H | H | scarlet |
| 7 | Cl | Cl | H | $CH_3$ | H | H | H | scarlet |
| 8 | Cl | $OCH_3$ | H | $CH_3$ | H | H | H | orange |
| 9 | Cl | Cl | $CH_3$ | $CH_3$ | H | H | H | red |
| 10 | Cl | Cl | H | $OCH_3$ | H | H | H | red |
| 11 | Cl | Cl | $CH_3$ | $OCH_3$ | H | H | H | red |

TABLE I-continued

| No | Y1 | Z1 | R | R1 | R2 | R3 | R4 | Shade |
|---|---|---|---|---|---|---|---|---|
| 12 | OCH3 | OCH3 | H | Cl | H | H | H | yellow |
| 13 | Cl | Cl | CH3 | Cl | H | H | H | orange |
| 14 | Cl | Cl | H | Br | H | H | H | orange |
| 15 | Cl | Cl | CH3 | Br | H | H | H | orange |
| 16 | Cl | Cl | H | phenyl | H | H | H | scarlet |
| 17 | Cl | Cl | CH3 | phenyl | H | H | H | red |
| 18 | Cl | Cl | H | phenoxy | H | H | H | yellow |
| 19 | Cl | Cl | H | CH3 | CH3 | H | H | scarlet |
| 20 | Cl | OCH3 | H | CH3 | CH3 | H | H | orange |
| 21 | Cl | Cl | CH3 | CH3 | CH3 | H | H | red |
| 22 | Cl | Cl | H | CH3 | H | CH3 | H | yellow |
| 23 | Cl | Cl | H | —OCH3 | OCH3 | H | H | yellow |
| 24 | Cl | Cl | H | —OCH3 | H | OCH3 | H | yellow |
| 25 | Cl | Cl | H | Cl | Cl | H | H | orange |
| 26 | Cl | OCH3 | H | Cl | Cl | H | H | yellow |
| 27 | Cl | Cl | CH3 | Cl | Cl | H | H | orange |
| 28 | Cl | OCH3 | CH3 | Cl | Cl | H | H | yellow |
| 29 | Cl | Cl | H | Cl | H | Cl | H | yellow |
| 30 | Cl | Cl | H | —OC2H5 | H | H | H | orange |
| 31 | Cl | Cl | H | F | H | H | H | yellowish orange |
| 32 | Cl | Cl | H | —C2H5 | H | H | H | orange |
| 33 | Cl | Cl | H | H | H | OCH3 | OCH3 | yellow |
| 34 | Cl | Cl | CH3 | F | H | H | H | orange |
| 35 | Cl | Cl | H | Cl | H | CH3 | CH3 | yellow |
| 36 | Cl | Cl | H | Cl | H | OCH3 | OCH3 | yellow |
| 37 | Cl | Cl | H | H | H | CH3 | CH3 | yellow |
| 38 | Cl | Cl | CH3 | OC2H5 | H | H | H | red |
| 39 | Cl | Cl | CH3 | —C2H5 | H | H | H | scarlet |
| 40 | Cl | Cl | CH3 | 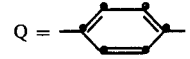 | H | H | H | orange |

$$Q = \text{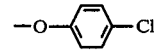}$$

| No | Y1 | Z1 | R | R1 | R2 | R3 | R4 | Shade |
|---|---|---|---|---|---|---|---|---|
| 41 | Cl | Cl | H | H | H | H | H | orange |
| 42 | Cl | Cl | H | CH3 | H | H | H | yellow |
| 43 | Cl | Cl | H | OCH3 | H | H | H | yellow |
| 44 | Cl | Cl | H | Cl | H | H | H | yellow |

EXAMPLE 45

17.25 g of 3,4,5,6-tetrachloro-o-cyanobenzoic acid methyl ester are stirred with 57.5 ml of 1 N sodium methylate solution in methanol until a clear solution is obtained, whereupon the sodium salt of 3,3-dimethoxy-4,5,6,7-tetrachloroisoindolinone forms. Then 5.25 g of 4,4',4'',4'''-tetraamino-tetraphenylketazine (finely ground and sieved) are stirred in and the reaction flask is subsequently rinsed with methanol. The reaction mixture is then kept gently at the boil at a bath temperature of 80° C. The temperature is raised to 100° C. while distilling off methanol. The reaction mixture is diluted with a further 100 ml of o-dichlorobenzene and acidified with 20 ml of glacial acetic acid. The temperature is raised to 140°–145° C. and kept thereat for 2 hours with good stirring. The pigment is collected by filtration at 120° C. and the filter cake is washed with methanol, acetone and water and dried, affording 18 g of a productive orange pigment which, in the form in which it is obtained or after it has been ground by one of the conventional methods, can be used for the preparation of lacquers and printing pastes as well as for incorporation in plastics. The resulting orange colourations have outstanding fastness properties.

Analysis: Calculated C 46.8; H 1.3; N 9.4. Found: C 45.9; H 1.6; N 9.3.

EXAMPLES 46 TO 56

Table II lists further pigments which are obtained by condensing an isoindolinone of the formula (IX), wherein $Y_1$ and $Z_1$ have the indicated meanings, with the tetraaminoazines also listed in the table.

TABLE II

Q = direct bond

| No. | Y1 | Z1 | Tetraaminoazine | Shade |
|---|---|---|---|---|
| 46 | Cl | Cl | 4,4',3'',3'''-tetraamino-tetraphenylketazine | yellow |
| 47 | Cl | Cl | 4,4',3'',3'''-tetraamino-4'',4'''-dichlorotetraphenylketazine | orange |
| 48 | Cl | Cl | 4,4'-diamino-4'',4'''-di(o-aminophenoxy)-tetraphenylketazine | " |
| 49 | Cl | Cl | 4,4'-diamino-4'',4'''-di-(p-aminophenoxy)-tetraphenylketazine | " |
| 50 | Cl | Cl | 4,4'-diamino-4'',4'''-di-(p-amino-o-chlorophenoxy)-tetraphenylketazine | " |
| 51 | Cl | —OCH3 | 4,4',4'',4'''-tetraamino-tetraphenylketazine | yellowish orange |
| 52 | Cl | Cl | 4,4'-diamino-3'',3'''-dichloro-4'',4'''-di-[p-aminophenoxy]-tetraphenylketazine | yellow |
| 53 | Cl | Cl | 4,4'-diamino-3'',3'''-dichloro-4'',4'''-di-(o-chloro-p-aminophenoxy)-tetraphenylketazine | yellow |
| 54 | Cl | Cl | 4,4'-diamino-3,3'-dimethyl-3'',3'''-dichloro-4'',4'''-di-(o-chloro-p-aminophenoxy)-tetraphenylketazine | yellow |
| 55 | Cl | Cl | 4,4'-diamino-4'',4'''-(p-aminophenyl)-tetraphenylketazine | orange |
| 56 | Cl | Cl | 4,4'-diamino-3,3'-dimethyl-3'',3'''-dichloro-4'',4'''-(p-aminophenoxy)-tetraphenylketazine | orange |

EXAMPLE 57

The procedure of Example 1 is repeated using 11 g of the 4,4''-diamino-4'-chloro-4'''-methyltetraphenylketazine obtained in accordance with Example 213 instead of 11,5 g of 4,4''-diamino-4',4'''-dichloro-tetraphenylketazine.

Yield: 23.2 g of a much redder orange pigment which has similarly good properties when incorporated into the different substrates.

EXAMPLES 58 TO 135

The following table lists further pigments which are obtained by condensing 3,3-dimethoxy-4,5,6,7-tetrachloroisoindolinone-1 with diamino-tetraphenylketazines of the formula

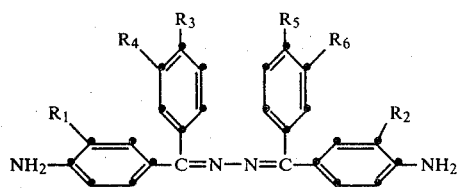

wherein $R_1-R_6$ have the meanings indicated in the table.

TABLE

| No | R₁ | R₂ | R₃ | R₄ | R₅ | R₆ | Shade |
|---|---|---|---|---|---|---|---|
| 58 | H | H | Cl | H | CH₃ | CH₃ | orange |
| 59 | H | H | H | H | CH₃ | H | orange |
| 60 | H | H | CH₃ | H | OCH₃ | H | scarlet |
| 61 | H | H | H | H | Cl | H | orange |
| 62 | H | H | Cl | H | Br | H | orange |
| 63 | H | H | Br | H | H | H | orange |
| 64 | H | H | CH₃ | H | Br | H | scarlet |
| 65 | H | H | CH₃ | CH₃ | H | H | scarlet |
| 66 | H | H | CH₃ | H | CH₃ | CH₃ | scarlet |
| 67 | H | H | OCH₃ | H | H | H | scarlet |
| 68 | H | H | Br | H | OCH₃ | H | orange |
| 69 | H | H | –C₆H₅ | H | CH₃ | H | orange |
| 70 | H | H | –C₆H₅ | H | H | H | orange |
| 71 | H | H | CH₃ | CH₃ | OCH₃ | H | red |
| 72 | H | H | Cl | H | OCH₃ | H | orange |
| 73 | H | H | CH₃ | H | Cl | Cl | orange |
| 74 | H | H | H | H | Cl | Cl | orange |
| 75 | H | H | OCH₃ | H | Cl | Cl | orange |
| 76 | CH₃ | H | Cl | H | H | H | orange |
| 77 | H | H | Cl | Cl | CH₃ | CH₃ | orange |
| 78 | H | H | Cl | Cl | Cl | H | orange |
| 79 | CH₃ | H | Cl | H | OCH₃ | H | orange |
| 80 | CH₃ | H | Cl | H | Cl | H | orange |
| 81 | CH₃ | H | Cl | H | CH₃ | H | orange |
| 82 | CH₃ | H | Cl | H | Br | H | orange |
| 83 | H | H | Br | H | CH₃ | CH₃ | orange |
| 84 | H | H | Br | H | Cl | Cl | orange |
| 85 | CH₃ | H | H | H | H | H | scarlet |
| 86 | CH₃ | H | CH₃ | H | H | H | scarlet |
| 87 | CH₃ | H | CH₃ | H | Cl | H | orange |
| 88 | CH₃ | H | H | H | OCH₃ | H | orange |
| 89 | CH₃ | H | CH₃ | CH₃ | CH₃ | H | red |
| 90 | CH₃ | H | CH₃ | CH₃ | OCH₃ | H | scarlet |
| 91 | CH₃ | H | OCH₃ | H | CH₃ | H | scarlet |
| 92 | CH₃ | H | CH₃ | H | CH₃ | H | scarlet |
| 93 | CH₃ | H | CH₃ | H | OCH₃ | H | scarlet |
| 94 | CH₃ | H | OCH₃ | H | OCH₃ | H | scarlet |
| 95 | CH₃ | H | OCH₃ | H | H | H | scarlet |
| 96 | CH₃ | H | H | H | CH₃ | H | scarlet |
| 97 | CH₃ | H | OCH₃ | H | Cl | H | orange |
| 98 | CH₃ | H | CH₃ | H | CH₃ | CH₃ | scarlet |
| 99 | CH₃ | H | CH₃ | H | Br | H | orange |
| 100 | CH₃ | H | OCH₃ | H | Br | H | orange |
| 101 | CH₃ | H | H | H | CH₃ | CH₃ | scarlet |
| 102 | CH₃ | H | CH₃ | CH₃ | CH₃ | CH₃ | red |
| 103 | CH₃ | H | Cl | H | Cl | Cl | orange |
| 104 | CH₃ | H | CH₃ | CH₃ | Br | H | orange |
| 105 | CH₃ | H | Cl | H | CH₃ | CH₃ | orange |
| 106 | CH₃ | H | OCH₃ | H | CH₃ | CH₃ | red |
| 107 | CH₃ | H | H | H | Cl | Cl | orange |
| 108 | CH₃ | H | H | H | Br | H | orange |
| 109 | CH₃ | H | H | H | Cl | H | orange |
| 110 | CH₃ | H | CH₃ | H | Cl | Cl | orange |
| 111 | CH₃ | H | OCH₃ | H | Cl | Cl | orange |
| 112 | CH₃ | H | CH₃ | CH₃ | –C₆H₅ | H | red |
| 113 | CH₃ | H | OCH₃ | H | –C₆H₅ | H | red |
| 114 | CH₃ | CH₃ | Cl | H | H | H | orange |
| 115 | CH₃ | CH₃ | CH₃ | CH₃ | H | H | red |
| 116 | CH₃ | CH₃ | CH₃ | H | H | H | scarlet |
| 117 | CH₃ | CH₃ | OCH₃ | H | H | H | red |
| 118 | CH₃ | H | CH₃ | CH₃ | Cl | Cl | orange |
| 119 | CH₃ | CH₃ | C₂H₅ | H | CH₃ | H | red |
| 120 | CH₃ | CH₃ | C₂H₅ | H | OCH₃ | H | red |
| 121 | CH₃ | CH₃ | CH₃ | H | Cl | H | orange |
| 122 | CH₃ | CH₃ | CH₃ | H | OCH₃ | H | scarlet |
| 123 | CH₃ | CH₃ | CH₃ | CH₃ | CH₃ | H | red |
| 124 | CH₃ | CH₃ | CH₃ | CH₃ | OCH₃ | H | red |
| 125 | CH₃ | CH₃ | OCH₃ | H | Cl | H | orange |
| 126 | CH₃ | CH₃ | CH₃ | CH₃ | Cl | H | scarlet |
| 127 | CH₃ | CH₃ | C₂H₅ | H | H | H | scarlet |
| 128 | CH₃ | CH₃ | C₂H₅ | H | Cl | H | orange |
| 129 | CH₃ | H | C₂H₅ | H | CH₃ | H | scarlet |
| 130 | CH₃ | CH₃ | C₂H₅ | H | CH₃ | CH₃ | red |
| 131 | CH₃ | H | C₂H₅ | H | OCH₃ | H | red |
| 132 | CH₃ | H | C₂H₅ | H | Cl | H | orange |
| 133 | CH₃ | H | C₂H₅ | H | CH₃ | CH₃ | scarlet |
| 134 | CH₃ | H | C₂H₅ | H | –C₆H₅ | H | orange |
| 135 | CH₃ | H | C₂H₅ | H | Br | H | orange |

EXAMPLE 136

A suspension of 92.4 g of 4-amino-4'-chlorobenzophenone, 1.5 g of zinc chloride and 11 ml of hydrazine hydrate in 200 ml of ethylene glycol monomethyl ether is heated for 22 hours to the boil, in the course of which the internal temperature falls from 116° C. to 112° C. on account of the water which forms, and the odour of hydrazine disappears. Then 125 ml of a mixture of ethylene glycol monomethyl ether/water is distilled off in the descending cooler in the course of 24 hours and simultaneously 100 ml of solvent is added dropwise. The internal temperature rises to 125° C. and a clear solution forms. On cooling, the reaction product crystallises out. The mass is diluted with 200 ml of alcohol and filtered after brief standing. The filter cake is washed with alcohol and dried, affording 65 g of 4,4''-diamino-4',4'''-dichlorotetraphenylketazine (71% of theory) with a melting point of 224°–227° C. A further 18.3 g of reaction product with a melting point of 221°–223° C. are obtained from the mother liquor by evaporating the solvent and stirring the residue in alcohol. The total yield is accordingly 91%.

EXAMPLES 137 TO 212

Table III lists further ketazines of the formula

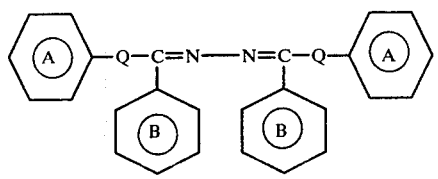

which are obtained by condensing hydrazine hydrate with a benzophenone of the formula

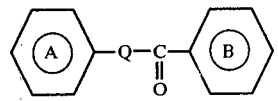

in ethylene glycol monomethyl ether. The position and nature of the substituents are indicated in columns 2 and 3 respectively of the table. In this connection it is to be observed that, depending on their constitution, he tetraphenylketazines are in the form of different stereoisomoic mixtures and can also be processed as such.

When using benzophenones which are difficult to condense, in particular 2"- and 2'''-methyl-substituted benzophenones, it is advantageous to replace ethylene glycol monomethyl ether by ethylene glycol monoethyl ether or diethylene glycol dimethyl ether, and to carry out the second step of the reaction at a temperature of 135° to 165° C.

TABLE III

Q = direct bond

| Ex. No. | Position and nature of the substituents of A | B | Melting point in °C. | calc. found C% | H% | N% |
|---|---|---|---|---|---|---|
| 137 | 2-amino | — | 205–207 | 79.97 | 5.68 | 14.35 |
|  |  |  |  | 79.8 | 5.8 | 14.3 |
| 138 | 4-amino | — | 223–226 | 79.97 | 5.68 | 14.35 |
|  |  |  |  | 79.9 | 5.7 | 14.5 |
| 139 | 3-amino | 4-methyl | 168–173 | 80.35 | 6.26 | 13.4 |
|  |  |  |  | 79.6 | 6.3 | 13.4 |
| 140 | 4-amino | " | 240–245 | 80.35 | 6.26 | 13.4 |
|  |  |  |  | 80.1 | 6.4 | 13.5 |
| 141 | 4-amino-3-methyl | — | 238–240 | 80.35 | 6.26 | 13.4 |
|  |  |  |  | 80.5 | 6.4 | 13.5 |
| 142 | 4-amino-3-methyl | 4-methyl | 256–259 | 80.68 | 6.77 | 12.54 |
|  |  |  |  | 80.3 | 6.6 | 12.6 |
| 143 | 4-amino | 2,4-dimethyl | 200–203 | 80.7 | 6.77 | 12.54 |
|  |  |  |  | 80.2 | 6.9 | 12.5 |
| 144 | " | 3,4-dimethyl | 198–200 | 80.7 | 6.77 | 12.54 |
|  |  |  |  | 80.4 | 6.9 | 12.5 |
| 145 | 4-amino-3-methyl | 2,4-dimethyl | 202–204 | 80.97 | 7.2 | 11.8 |
|  |  |  |  | 80.9 | 7.3 | 12.0 |
| 146 | 4-amino-3-methyl | 3,4-dimethyl | 230–232 | 80.97 | 7.2 | 11.8 |
|  |  |  |  | 80.4 | 7.3 | 11.8 |
| 147 | 3-amino-4-methoxy | — | 191–193 | 74.64 | 5.82 | 12.44 |
|  |  |  |  | 74.7 | 5.9 | 12.4 |
| 148 | 4-amino | 4-methoxy | 233–236 | 74.64 | 5.82 | 12.44 |
|  |  |  |  | 74.8 | 5.9 | 12.8 |
| 149 | 4-amino-3-methyl | " | 220–223 | 75.3 | 6.3 | 11.7 |
|  |  |  |  | 75.2 | 6.5 | 11.7 |
| 150 | 4-amino-3-methyl | 4-methyl | 175–177 | 75.3 | 6.3 | 11.7 |
|  |  |  |  | 75.1 | 6.4 | 11.6 |
| 151 | 3-amino-4-methoxy | 4-methoxy | 167–170 | 70.57 | 5.9 | 10.97 |
|  |  |  |  | 70.4 | 6.1 | 10.9 |
| 152 | 4-amino | 2,4-dimethoxy | 240–241 | 70.57 | 5.9 | 10.97 |
|  |  |  |  | 70.5 | 5.9 | 10.8 |
| 153 | " | 3,4-dimethoxy | 218–221 | 70.57 | 5.9 | 10.97 |
|  |  |  |  | 70.4 | 6.0 | 11.0 |
| 154 | 4-amino | 4-ethoxy | 219–221 | 75.3 | 6.3 | 11.7 |
|  |  |  |  | 75.3 | 6.7 | 11.5 |
| 155 | " | 4-isopropoxy | 197–199 | 80.97 | 7.2 | 11.8 |
|  |  |  |  | 80.3 | 7.3 | 12.3 |
| 156 | " | 4-tert-butyl | 157–160 | 81.2 | 7.6 | 11.15 |
|  |  |  |  | 81.0 | 7.7 | 11.1 |
| 157 | 4-amino-2-chloro | — | 211–212 | 68.0 | 4.4 | 12.2 |
|  |  |  |  | 68.0 | 4.6 | 12.0 |
| 158 | 4-amino | 4-bromo | 232–245 | 56.95 | 3.6 | 10.2 |
|  |  |  |  | 57.1 | 3.7 | 10.4 |
| 159 | 2-amino-3-methyl | " | 227–230 | 58.35 | 4.2 | 9.7 |
|  |  |  |  | 58.5 | 4.2 | 9.9 |
| 160 | 2-amino-3-methyl | 4-chloro | 216–219 | 69.0 | 4.96 | 11.5 |
|  |  |  |  | 68.7 | 5.1 | 11.6 |
| 161 | 4-amino-2-chloro | 4-methyl | 266–268 | 69.0 | 4.96 | 11.5 |
|  |  |  |  | 68.9 | 5.1 | 11.8 |
| 162 | 4-amino-2-chloro | 4-methoxy | 223–226 | 64.75 | 4.66 | 10.8 |
|  |  |  |  | 64.9 | 4.6 | 10.9 |
| 163 | 3-amino-4-methoxy | 4-chloro | 200–203 | 64.76 | 4.66 | 10.8 |
|  |  |  |  | 64.6 | 4.8 | 11.0 |
| 164 | 3-amino- | 4-ethoxy | 170–173 | 65.8 | 5.15 | 10.2 |

TABLE III-continued

| | | | | | | |
|---|---|---|---|---|---|---|
| | 4-chloro | | | 65.7 | 5.2 | 10.5 |
| 165 | 4-amino-2-chloro | 4-bromo | 234–235 | 50.6 / 51.0 | 2.94 / 2.9 | 9.08 / 9.2 |
| 166 | 3-amino-4-chloro | 4-chloro | 213–215 | 59.1 / 59.3 | 3.4 / 3.3 | 10.6 / 10.7 |
| 167 | 4-amino-2-chloro | " | 237–238 | 59.1 / 59.3 | 3.4 / 3.6 | 10.6 / 10.8 |
| 168 | 4-amino | 2,4-dichloro | 242–245 | 59.1 / 58.9 | 3.4 / 3.7 | 10.6 / 10.4 |
| 169 | 4-amino | 3,4-dichloro | 194–198 | 59.1 / 58.5 | 3.4 / 3.6 | 10.6 / 10.6 |
| 170 | 4-amino-3-methyl | 2,4-dichloro | 222–224 | 60.45 / 60.4 | 4.0 / 4.1 | 10.07 / 10.0 |
| 171 | 4-amino-3-methyl | 3,4-dichloro | 219–221 | 60.45 / 60.4 | 4.0 / 4.2 | 10.07 / 10.1 |
| 172 | 4-amino | 4-phenyl | 261–263 | 84.1 / 83.7 | 5.57 / 5.6 | 10.3 / 10.4 |
| 173 | " | 4-phenoxy | 206–208 | 79.4 / 79.2 | 5.26 / 5.1 | 9.75 / 9.8 |
| 174 | 4-amino-3-methyl | 4-phenyl | 285–288 | 84.18 / 83.5 | 6.0 / 6.1 | 9.8 / 9.8 |
| 175 | 4-amino-3-methyl | 4-phenoxy | 208–210 | 79.7 / 79.3 | 5.7 / 5.8 | 9.3 / 9.4 |
| 176 | 3-amino | 3-amino | 223–224 | 74.26 / 74.2 | 5.75 / 5.7 | 20.0 / 19.9 |
| 177 | 4-amino | 3-amino | 247–250 | 74.26 / 74.1 | 5.76 / 6.0 | 20.0 / 20.2 |
| 178 | " | 4-amino | 295–298 | 74.26 / 73.6 | 5.75 / 5.8 | 20.0 / 19.9 |
| 179 | 3-amino-4-methoxy | 3-amino-4-methoxy | 202–205 | 66.65 / 66.5 | 5.97 / 6.0 | 15.55 / 15.7 |
| 180 | 4-amino | 3-amino-4-chloro | 243–246 | 63.93 / 63.6 | 4.63 / 4.7 | 17.2 / 17.2 |
| 181 | " | 4-o-aminophenoxy | 215–217 | 75.48 / 74.8 | 5.33 / 5.5 | 13.9 / 13.6 |
| 182 | " | 4-p-aminophenoxy | 285–287 | 75.48 / 75.2 | 5.33 / 5.7 | 13.9 / 13.6 |
| 183 | 4-amino-3-methyl | 4-p-aminophenoxy | 200–203 | 75.9 / 75.4 | 5.7 / 5.6 | 13.28 / 13.1 |
| 184 | 4-amino | 4-o-amino-p-chlorophenoxy | 204–207 | 67.76 / 67.3 | 4.5 / 4.5 | 12.48 / 12.2 |
| 185 | " | 4-o-chloro-p-aminophenoxy | 245–248 | 67.76 / 67.8 | 4.5 / 4.6 | 12.48 / 12.4 |
| 186 | 4-amino-3-methyl | 4-o-chloro-p-aminophenoxy | 242–245 | 68.47 / 68.3 | 4.88 / 4.9 | 11.98 / 11.8 |
| 187 | 4-amino-3-methyl | 4-o-amino-p-chlorophenoxy | 213–216 | 68.47 / 68.2 | 4.88 / 4.9 | 11.98 / 11.70 |
| 188 | 4-amino | 3-chloro-4-p-aminophenoxy | 288–291 | 67.76 / 67.6 | 4.5 / 4.5 | 12.48 / 12.4 |
| 189 | " | 3-chloro-4-o-chloro-p-aminophenoxy | 206–209 | 61.47 / 61.5 | 3.8 / 4.0 | 11.3 / 10.8 |
| 190 | 4-amino | 4-fluoro | 193–197 | 73.23 / 72.8 | 4.7 / 4.6 | 13.14 / 13.5 |
| 191 | 4-amino | 4-ethyl | 217–219 | 80.68 / 80.1 | 6.77 / 6.8 | 12.54 / 12.5 |
| 192 | 4-amino-3-methyl | 3-chloro-4-(o-chloro-p-aminophenoxy) | 158–160 | 62.35 / 62.0 | 4.2 / 4.3 | 10.9 / 11.0 |
| 193 | 4-amino | 4-(p-aminophenyl) | <300 | 79.7 / 79.4 | 5.6 / 5.7 | 14.67 / 14.5 |
| 194 | 4-amino | 2,5-dimethoxy | 253–256 | 70.57 / 70.1 | 5.9 / 6.0 | 10.97 / 10.9 |
| 195 | 4-amino-3-methyl | 4-fluoro | 255–257 | 74.0 / 73.7 | 5.3 / 5.4 | 8.36 / 8.2 |
| 196 | 4-amino | 2,5-dimethyl-4-chloro | 256–260 | 69.9 / 69.4 | 5.47 / 5.6 | 10.87 / 10.7 |
| 197 | 4-amino-3-methyl | 4-cyclohexyl | 177–180 | 82.43 / 82.0 | 7.96 / 8.1 | 9.6 / 9.6 |
| 198 | 4-amino | 4-cyclohexyl | 214–218 | 82.27 / 81.9 | 7.6 / 7.5 | 10.1 / 9.9 |
| 199 | 4-amino | 2,5-dimethoxy-4-chloro | 238–242 | 62.18 / 61.9 | 4.87 / 4.9 | 9.67 / 9.8 |
| 200 | 4-amino | 2,5-di- | 241–245 | 80.68 | 6.77 | 12.54 |

TABLE III-continued

| | | | | | | |
|---|---|---|---|---|---|---|
| 201 | 4-amino-3-methyl | methyl | | 80.6 | 6.9 | 12.5 |
| | | 4-ethoxy | 223–226 | 75.86 | 6.76 | 11.06 |
| | | | | 75.8 | 6.9 | 11.3 |
| 202 | 4-amino-3-methyl | 4-ethyl | 221–225 | 80.97 | 7.22 | 11.8 |
| | | | | 80.7 | 7.3 | 12.0 |
| 203 | 4-amino-3-methyl | 4-(p-chloro-phenoxy) | 195–198 | 71.5 | 4.8 | 8.3 |
| | | | | 71.6 | 5.0 | 8.3 |
| 204 | 4-amino-3-methyl | 2,5-di-methyl-4-chloro | 192–198 | 70.7 | 5.9 | 10.3 |
| | | | | 70.5 | 6.0 | 9.9 |
| 205 | 4-amino-3-methyl | 2,5-di-methoxy | 210–211 | 71.35 | 6.36 | 10.4 |
| | | | | 71.2 | 6.4 | 10.5 |
| 206 | 4-amino-3-methyl | 3,4-di-methoxy | 209–212 | 71.35 | 6.36 | 10.4 |
| | | | | 71.3 | 6.4 | 10.4 |
| 207 | 4-amino-3-methyl | 2,4-di-methoxy | 219–220 | 71.35 | 6.36 | 10.4 |
| | | | | 71.4 | 6.5 | 10.5 |
| 208 | 4-amino-3-methyl | 2,5-di-methoxy-4-chloro | 216–219 | 63.26 | 5.31 | 9.22 |
| | | | | 62.8 | 5.5 | 9.0 |

$Q = $ 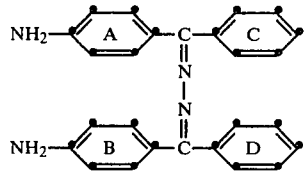

| | | | | | | |
|---|---|---|---|---|---|---|
| 209 | 4-amino | — | 192–196 | 84.1 | 5.57 | 10.32 |
| | | | | 84.7 | 5.4 | 10.2 |
| 210 | 4-amino | 4-methyl | 230–233 | 84.18 | 6.01 | 9.92 |
| | | | | 84.0 | 5.9 | 9.6 |
| 211 | 4-amino | 4-methoxy | 228–231 | 79.71 | 5.69 | 9.3 |
| | | | | 79.3 | 5.8 | 9.1 |
| 212 | 4-amino | 4-chloro | 215–220 | 74.6 | 4.6 | 9.16 |
| | | | | 74.1 | 4.7 | 9.2 |

EXAMPLE 213

To a suspension of 23.1 g of 4-amino-4'-chlorobenzophenone in 100 ml of ethylene glycol monomethyl ether are added 0.75 g of zinc chloride and 5.5 ml of hydrazine hydrate. The reaction mixture is boiled overnight at a bath temperature of 150° C., in the course of which the boiling temperature falls from 118° C. to 115° C. on account of the water which forms. Then 21.1 g of 4-amino-4'-methylbenzophenone are added to the resulting turbid solution. Then 21 ml of solvent are distilled off at a bath temperature of 160° C. and the internal temperature rises to 122°–125° C. This temperature is kept for 24 hours, whereupon a portion of the reaction product crystallises out. After cooling, the resulting 4,4''-diamino-4'-chloro-4'''-methyltetraphenylketazine is collected by filtration, washed with alcohol and water and dried in vacuo at 80° C., affording 30 g (68%) of reaction product with a melting point of 225°–226° C.

Analysis: Calculated: C 73.88%; H 5.28%; N 12.76%; Cl 8.08%. Found: 73.7%; 5.3%; 13.00%; 7.8%.

Table IV lists further ketazines of the formula

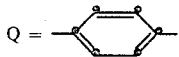

which are obtained by condensing 1 mole of 4-aminobenzophenone of the formula

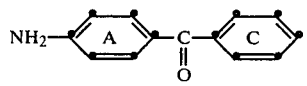

and 1 mole of 4-aminobenzophenone of the formula

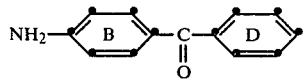

with 1 mole of hydrazine hydrate in ethylene glycol.

TABLE IV

| Ex. No. | A | B | C | D | m.p. (°C.) | Analysis C | H | N |
|---|---|---|---|---|---|---|---|---|
| 214 | — | — | — | 4-CH₃ | 196°–199° | 80.17 | 5.98 | 13.85 |
| | | | | | | 79.8 | 6.1 | 13.7 |
| 215 | — | — | 4-CH₃ | 4-OCH₃ | 217°–221° | 77.39 | 6.03 | 12.89 |
| | | | | | | 77.3 | 6.2 | 12.8 |
| 216 | — | — | — | 4-Cl | 190°–192° | 73.49 | 4.98 | 13.19 |
| | | | | | | 73.0 | 5.0 | 13.0 |
| 217 | — | — | 4-Cl | 4-Br | 222°–224° | 61.98 | 4.0 | 11.12 |
| | | | | | | 61.8 | 4.2 | 11.2 |
| 218 | — | — | — | 4-Br | 177°–182° | 66.35 | 4.51 | 11.94 |
| | | | | | | 66.1 | 4.6 | 11.9 |
| 219 | — | — | 4-CH₃ | 4-Br | 233°–235° | 67.09 | 4.8 | 11.59 |
| | | | | | | 67.5 | 5.0 | 11.7 |
| 220 | — | — | 4-CH₃ | 3,4-di-CH₃ | 204°–208° | 80.5 | 6.5 | 12.95 |
| | | | | | | 80.3 | 6.6 | 12.9 |
| 221 | — | — | 4-Br | 4-OCH₃ | 212°–218° | 64.94 | 4.64 | 11.22 |

TABLE IV-continued

| Ex. No. | A | B | C | D | m.p. (°C.) | C | H | N |
|---|---|---|---|---|---|---|---|---|
| 222 | — | — | 4— | — | 178°–183° | 64.8<br>82.37<br>81.9 | 4.7<br>5.62<br>5.7 | 11.2<br>12.01<br>11.7 |
| 223 | — | — | 4-OCH₃ | 3,4-di-CH₃ | 198°–201° | 77.65<br>77.3 | 6.29<br>6.2 | 12.49<br>12.5 |
| 224 | — | — | 4-Cl | 4-OCH₃ | 208°–212° | 71.28<br>71.0 | 5.09<br>5.2 | 12.31<br>12.2 |
| 225 | 3-CH₃ | — | 4-Cl | — | 168°–173° | 73.88<br>73.5 | 5.28<br>5.3 | 12.76<br>12.7 |
| 226 | — | — | 3,4-di-CH₃ | 3,4-di-Cl | 194°–197° | 69.0<br>68.7 | 4.96<br>5.1 | 11.5<br>11.5 |
| 227 | — | — | 4-Cl | 3,4-di-Cl | 188°–192° | 63.24<br>63.2 | 3.88<br>4.1 | 11.35<br>11.5 |
| 228 | 3-CH₃ | — | 4-Cl | 4-Cl | 148°–155° | 68.5<br>68.3 | 4.7<br>4.9 | 11.84<br>11.8 |
| 229 | 3-CH₃ | — | 4-Cl | 4-CH₃ | 179°–187° | 74.24<br>73.6 | 5.56<br>5.6 | 12.37<br>12.3 |
| 230 | 3-CH₃ | — | 4-Cl | 4-Br | 176°–181° | 62.62<br>62.4 | 4.28<br>4.4 | 10.82<br>10.9 |
| 231 | — | — | 4-Br | 3,4-di-CH₃ | 187°–191° | 67.61<br>67.1 | 5.07<br>5.2 | 11.26<br>11.0 |
| 232 | — | — | 4-Br | 3,4-di-Cl | 190°–198° | 58.02<br>57.8 | 3.56<br>3.7 | 10.4<br>10.3 |
| 233 | 3-CH₃ | — | — | — | 202°–208° | 80.17<br>80.1 | 6.0<br>6.2 | 13.85<br>13.8 |
| 234 | 3-CH₃ | — | 3,4-di-CH₃ | 4-CH₃ | — | 80.68<br>80.6 | 6.77<br>6.8 | 12.54<br>12.4 |
| 235 | 3-CH₃ | — | 3,4-di-CH₃ | 4-OCH₃ | 196°–205° | 77.89<br>77.3 | 6.54<br>6.6 | 12.11<br>12.2 |
| 236 | 3-CH₃ | — | 4-OCH₃ | 4-CH₃ | 190°–195° | 77.65<br>77.3 | 6.3<br>6.3 | 12.5<br>12.5 |
| 237 | 3-CH₃ | — | 4-CH₃ | 4-CH₃ | 229°–234° | 80.52<br>80.5 | 6.53<br>6.6 | 12.95<br>12.6 |
| 238 | 3-CH₃ | — | 4-CH₃ | 4-OCH₃ | — | 77.65<br>77.2 | 6.3<br>6.4 | 12.5<br>12.4 |
| 239 | 3-CH₃ | — | 4-OCH₃ | 4-OCH₃ | 192°–199° | 74.97<br>74.4 | 6.07<br>6.1 | 12.06<br>11.9 |
| 240 | 3-CH₃ | — | — | 4-CH₃ | — | 80.35<br>79.9 | 6.26<br>6.2 | 13.39<br>13.3 |
| 241 | 3-CH₃ | — | 4-OCH₃ | 4-Cl | 183°–187° | 71.71<br>71.2 | 5.37<br>5.5 | 11.95<br>12.0 |
| 242 | 3-CH₃ | — | 4-CH₃ | 3,4-di-CH₃ | 228°–237° | 80.68<br>80.4 | 6.77<br>6.8 | 12.54<br>12.5 |
| 243 | 3-CH₃ | — | 4-CH₃ | 4-Br | — | 67.61<br>67.3 | 5.07<br>5.2 | 11.26<br>11.3 |
| 244 | 3-CH₃ | — | — | 3,4-di-CH₃ | — | 80.5<br>79.9 | 6.5<br>6.2 | 12.95<br>13.0 |
| 245 | 3-CH₃ | — | 3,4-di-CH₃ | 3,4-di-CH₃ | 205°–215° | 80.83<br>80.6 | 7.0<br>7.0 | 12.16<br>12.1 |
| 246 | 3-CH₃ | — | 4-Cl | 3,4-di-Cl | 166°–170° | 63.86<br>64.0 | 4.17<br>4.2 | 11.03<br>11.2 |
| 247 | 3-CH₃ | — | 3,4-di-CH₃ | 4-Br | 190°–205° | 68.1<br>68.5 | 5.3<br>5.5 | 10.95<br>11.0 |
| 248 | 3-CH₃ | — | 4-Cl | 3,4-di-CH₃ | — | 74.58<br>73.8 | 5.83<br>5.7 | 12.0<br>11.9 |
| 249 | 3-CH₃ | — | 4-OCH₃ | 3,4-di-CH₃ | 190°–196° | 77.89<br>77.4 | 6.53<br>6.6 | 12.1<br>12.0 |
| 250 | 3-CH₃ | — | — | 3,4-di-Cl | — | 68.5<br>68.6 | 4.7<br>4.7 | 11.84<br>12.1 |
| 251 | 3-CH₃ | — | 4-CH₃ | 4— | — | 82.56<br>82.1 | 6.11<br>6.1 | 11.33<br>11.1 |
| 252 | 3-CH₃ | — | 3,4-di-CH₃ | 4— | — | 82.64<br>82.1 | 6.34<br>6.3 | 11.01<br>10.9 |
| 253 | 3-CH₃ | 3-CH₃ | 4-Cl | — | 186°–193° | 74.24<br>74.0 | 5.56<br>5.7 | 12.37<br>12.4 |
| 254 | 3-CH₃ | 3-CH₃ | 3,4-di-CH₃ | — | — | 80.68<br>80.4 | 6.77<br>6.7 | 12.54<br>12.4 |
| 255 | 3-CH₃ | 3-CH₃ | 4-C₂H₅ | 4-CH₃ | 227°–231° | 80.83<br>80.9 | 7.0<br>7.1 | 12.16<br>12.4 |
| 256 | 3-CH₃ | 3-CH₃ | 4-C₂H₅ | 4-OCH₃ | 228°–230° | 78.12<br>77.9 | 6.77<br>6.8 | 11.75<br>11.7 |
| 257 | 3-CH₃ | 3-CH₃ | 4-CH₃ | 4-Cl | 236°–240° | 74.58<br>75.0 | 5.83<br>6.1 | 12.0<br>12.1 |
| 258 | 3-CH₃ | — | 4-CH₃ | — | — | 80.35<br>80.2 | 6.26<br>6.4 | 13.39<br>13.3 |
| 259 | 3-CH₃ | 3-CH₃ | 4-CH₃ | 4-OCH₃ | 234°–238° | 77.89<br>77.8 | 6.54<br>6.7 | 12.11<br>12.2 |

TABLE IV-continued

| Ex. No. | A | B | C | D | m.p. (°C.) | Analysis C | H | N |
|---|---|---|---|---|---|---|---|---|
| 260 | 3-CH$_3$ | 3-CH$_3$ | 3,4-di-CH$_3$ | 4-CH$_3$ | 232°–234° | 80.83<br>81.0 | 7.0<br>7.2 | 12.16<br>12.3 |
| 261 | 3-CH$_3$ | 3-CH$_3$ | 3,4-di-CH$_3$ | 4-OCH$_3$ | 214°–217° | 78.12<br>78.2 | 6.77<br>6.8 | 11.75<br>11.7 |
| 262 | 3-CH$_3$ | 3-CH$_3$ | 4-OCH$_3$ | 4-Cl | 207°–210° | 72.11<br>71.9 | 5.63<br>5.7 | 11.6<br>11.6 |
| 263 | 3-CH$_3$ | 3-CH$_3$ | 3,4-di-CH$_3$ | 4-Cl | 198°–204° | 74.91<br>75.2 | 6.08<br>6.3 | 11.65<br>11.6 |
| 264 | 3-CH$_3$ | 3-CH$_3$ | 4-C$_2$H$_5$ | — | — | 80.68<br>80.6 | 6.77<br>6.9 | 12.54<br>12.5 |
| 265 | 3-CH$_3$ | 3-CH$_3$ | 4,C$_2$H$_5$ | 4-Cl | 205°–210° | 74.91<br>75.4 | 6.08<br>6.3 | 11.65<br>11.5 |
| 266 | 3-CH$_3$ | — | 4-C$_2$H$_5$ | 4-CH$_3$ | — | 80.68<br>80.1 | 6.77<br>6.8 | 12.54<br>12.7 |
| 267 | 3-CH$_3$ | 3-CH$_3$ | 4-C$_2$H$_5$ | 3,4-di-CH$_3$ | 203°–207° | 80.97<br>80.4 | 7.22<br>7.3 | 11.8<br>11.5 |
| 268 | 3-CH$_3$ | — | 4-C$_2$H$_5$ | 4-OCH$_3$ | 197°–204° | 77.89<br>77.6 | 6.54<br>6.6 | 12.11<br>12.0 |
| 269 | 3-CH$_3$ | — | 4-C$_2$H$_5$ | — | — | 80.52<br>80.0 | 6.5<br>6.5 | 12.95<br>12.7 |
| 270 | 3-CH$_3$ | — | 4-C$_2$H$_5$ | 4-Cl | — | 74.58<br>74.5 | 5.83<br>6.1 | 12.0<br>11.9 |
| 271 | 3-CH$_3$ | — | 4-C$_2$H$_5$ | 3,4-di-CH$_3$ | — | 80.83<br>80.3 | 7.0<br>7.1 | 12.16<br>11.8 |
| 272 | 3-CH$_3$ | — | 4-C$_2$H$_5$ | 4-Br | — | 68.1<br>68.4 | 5.3<br>5.5 | 10.95<br>10.8 |

EXAMPLE 273

2 g of the pigment obtained in Example 45 are ground with 36 g of toner dehydrate, 60 g of boiled linseed oil of medium viscosity and 2 g of cobalt linoleate on a three roll mill. The orange prints obtained with the resulting colour paste are strong and outstandingly fast to light.

EXAMPLE 274

0.6 g of the pigment obtained in Example 1 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The orange colouration obtained is strong and fast to migration, heat and light.

EXAMPLE 275

10 g of titanium dioxide and 2 g of the pigment obtained in Example 5 are ground for 48 hours in a ball mill with 88 g of a mixture of 26.4 g of coconut alkyl resin, 24 g of melamine/formaldehyde resin (30% solids content), 8.8 g of ethylene glycol monomethyl ether and 28.8 g of xylene. The resulting lacquer is sprayed onto an aluminium sheet, predried for 30 minutes at room temperature and then stoved for 30 minutes at 120° C., to give a yellow finish which has very good colour strength and is distinguished by very good fastness to overstripe bleeding, light and atmospheric influences.

EXAMPLE 276

8.03 g of 3-iminoisoindolin-1-one are added to a hot solution of 12.3 g of 4,4″-diamino-3′,4′,3‴,4‴-tetrachloro-tetraphenylketazine in 150 ml of glacial acetic acid. The reaction mixture is boiled for 10 minutes, whilst the pigment begins to precipitate after about 30 seconds. The precipitate is collected by filtration, washed with methanol, acetone and water and then dried, affording 15.7 g of a yellow pigment which, after it has been ground by one of the conventional methods, can be used for colouring plastics and for the preparation of lacquers and printing pastes. The resulting colourations are strong and distinguished by outstanding fastness properties.

Analysis: Calculated: C 64.14%; H 3.08%; N 10.69%; Cl 18.03%. Found: C 64.4%; H 3.22%; N 10.5%; Cl 17.65%.

EXAMPLE 277

6.7 g of 4,5-dichloro-2-cyanobenzoic acid methyl ester with a melting point of 129°–130° C. (prepared by the process of Example 1 of British Pat. No. 1,319,731 by reaction of the ammonium salt of 4,5-dichloro-2-cyanobenzoic acid with dimethyl sulfate) are stirred for 2 hours at room temperature with 28.75 ml of 1 N sodium methylate solution in methanol, whereupon a suspension of the sodium salt of 3,3-dimethoxy-5,6-dichloroisoindolin-1-one forms. Then 6.8 g of finely ground 4,4″-diamino-4′,4‴-dibromo-tetraphenylketazine and 150 ml of o-dichlorobenzene are added and the methyl alcohol is distilled off at a bath temperature of 110° C., while the internal temperature rises in the course of 2 hours to 100° C. The sodium salt of the pigment begins to precipitate at 80° C., without the ketazine having dissolved completely. The batch is diluted with a further 50 ml of o-dichlorobenzene and the temperature is kept at 100° C. for 3 hours. After acidification with 10 ml of glacial acetic acid, the internal temperature is raised to 140°–150° C. and the mixture is stirred for 2 hours at this temperature. The insoluble pigment is collected by filtration at 120° C. The filter cake is washed with methanol, acetone and water and dried.

Yield: 9.5 g of a productive yellow pigment which, after incorporation into plastics, printing pastes and lacquers, produces colourations distinguished by outstanding fastness properties.

Analysis: Calculated: C 53.4%; H 2.5%; N 8.9%; Cl 15.0%; Br 16.9%. Found: C 53.3%; H 2.6%; N 8.8%; Cl 14.7%; Br 16.7%.

What is claimed is:
1. An isoindolinone pigment of the formula

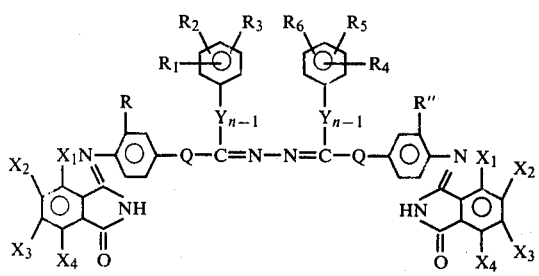

wherein $X_1$, $X_2$, $X_3$ and $X_4$ represent hydrogen or halogen atoms, or one or two of $X_1$–$X_4$ represent alkoxy groups of 1 to 4 carbon atoms or phenoxy groups and the others represent hydrogen or halogen atoms, R and R" represent hydrogen or halogen atoms or methyl or methoxy groups, $R_1$, $R_2$, $R_4$ and $R_5$ represent hydrogen, chlorine or bromine atoms or alkyl groups of 1 to 2 carbon atoms, $R_3$ and $R_6$ represent hydrogen or halogen atoms, alkyl or alkoxy groups of 1 to 2 carbon atoms or when $R_3$ and $R_6$ are independently in the meta or para position in respect to X, $R_3$ and $R_6$ may also be a group of the formula

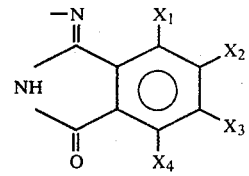

Q represents a direct bond or a p-phenylene groups, n is 1 or 2 and X represents a group of the formula

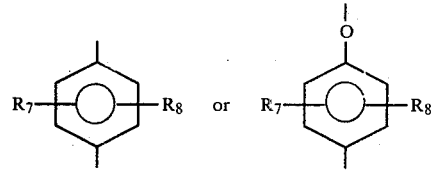

wherein $R_7$ and $R_8$ represent hydrogen or chlorine atoms or methyl groups.

2. An isoindoline pigment according to claim 1, wherein $X_1$ and $X_3$ are chlorine or bromine atoms or alkoxy groups of 1 to 4 carbon atoms; $X_2$ and $X_4$ are chlorine or bromine atoms.

3. An isoindoline pigment according to claim 1, wherein Q represents a direct bond.

4. An isoindoline pigment according to claim 1, wherein $X_1$–$X_4$ represent chlorine atoms.

5. An isoindoline pigment according to claim 1, wherein $R_3$ and $R_6$ represent hydrogen, chlorine or bromine atoms, methyl or methoxy groups in the para-position to X.

6. An isoindoline pigment according to claim 1, wherein n is 1.